US011811569B2

(12) United States Patent
Ferrer et al.

(10) Patent No.: US 11,811,569 B2
(45) Date of Patent: Nov. 7, 2023

(54) SENSOR INTEGRATED CIRCUITS HAVING A SINGLE EDGE NIBBLE TRANSMISSION (SENT) OUTPUT

(71) Applicant: Allegro MicroSystems, LLC, Manchester, NH (US)

(72) Inventors: Florencia Ferrer, Montevideo (UY); Jesse Lapomardo, Pembroke, NH (US); Lucas Intile, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 676 days.

(21) Appl. No.: 17/009,111

(22) Filed: Sep. 1, 2020

(65) Prior Publication Data

US 2022/0070035 A1    Mar. 3, 2022

(51) Int. Cl.
*H04L 67/12* (2022.01)
*H04L 27/18* (2006.01)
*G06F 16/23* (2019.01)

(52) U.S. Cl.
CPC .......... *H04L 27/18* (2013.01); *G06F 16/2365* (2019.01)

(58) Field of Classification Search
CPC . H04L 2012/40273; H04L 2012/40215; H04L 12/40; H04L 5/0094; H04L 63/08; H04L 12/40006; H04W 74/0808; H04W 84/12; H04W 74/08; H04W 40/24; H04W 56/001; H04W 74/085; H04W 16/10; G06F 13/4247; G06F 16/2365
USPC ........................................................ 375/295
See application file for complete search history.

(56) References Cited

U.S. PATENT DOCUMENTS

| | | |
|---|---|---|
| 6,288,567 B1 | 9/2001 | Fink |
| 6,968,484 B2 | 11/2005 | Hummel |
| 7,319,418 B2 | 1/2008 | Fink |
| 8,183,982 B2 | 5/2012 | Scherr |
| 8,519,819 B2 | 8/2013 | Scherr |
| 8,577,634 B2 | 11/2013 | Donovan et al. |
| 8,922,331 B2 | 12/2014 | Scherr |
| 9,172,565 B2 | 10/2015 | Cadugan et al. |
| 9,634,715 B2 | 4/2017 | Scheinkerman et al. |
| 9,739,846 B2 | 8/2017 | Petrie et al. |
| 9,753,830 B2 * | 9/2017 | Bowling ................. H04L 25/38 |
| 9,787,495 B2 | 10/2017 | Vreeland et al. |
| 10,129,339 B1 * | 11/2018 | Boerrigter ............... H04L 67/12 |
| 10,204,024 B2 * | 2/2019 | Bos ......................... H04L 43/50 |

(Continued)

FOREIGN PATENT DOCUMENTS

WO    WO-2016144555 A1 *    9/2016    ........... H04L 12/403

*Primary Examiner* — Eva Y Puente
(74) *Attorney, Agent, or Firm* — DALY, CROWLEY, MOFFORD & DURKEE, LLP

(57) ABSTRACT

A sensor includes a sensing element to produce a sensing element signal and a processor responsive to the sensing element signal to generate a sensor output signal comprising a Single Edge Nibble Transmission (SENT) frame. The SENT frame includes a Status and Communication (SCN) nibble comprising a bit 0 and a bit 1 that represent a status of at least one internal diagnostic indicator and a plurality of data nibbles. At least one of the plurality of data nibbles includes a cyclic redundancy check (CRC), the CRC being an encoding of the bit 0 and the bit 1 of the SCN nibble and the plurality of data nibbles and at least one of the plurality of data nibbles includes a count that indicates a new frame, the CRC being at least a five bit value.

20 Claims, 9 Drawing Sheets

(56) References Cited

U.S. PATENT DOCUMENTS

| | | |
|---|---|---|
| 10,326,621 B1 | 6/2019 | Geisler et al. |
| 10,747,708 B2 | 8/2020 | Kozomora et al. |
| 2013/0345924 A1* | 12/2013 | Tomar .................... H02M 1/36 |
| | | 375/224 |
| 2019/0199451 A1* | 6/2019 | Krall .................... H04B 14/026 |

* cited by examiner

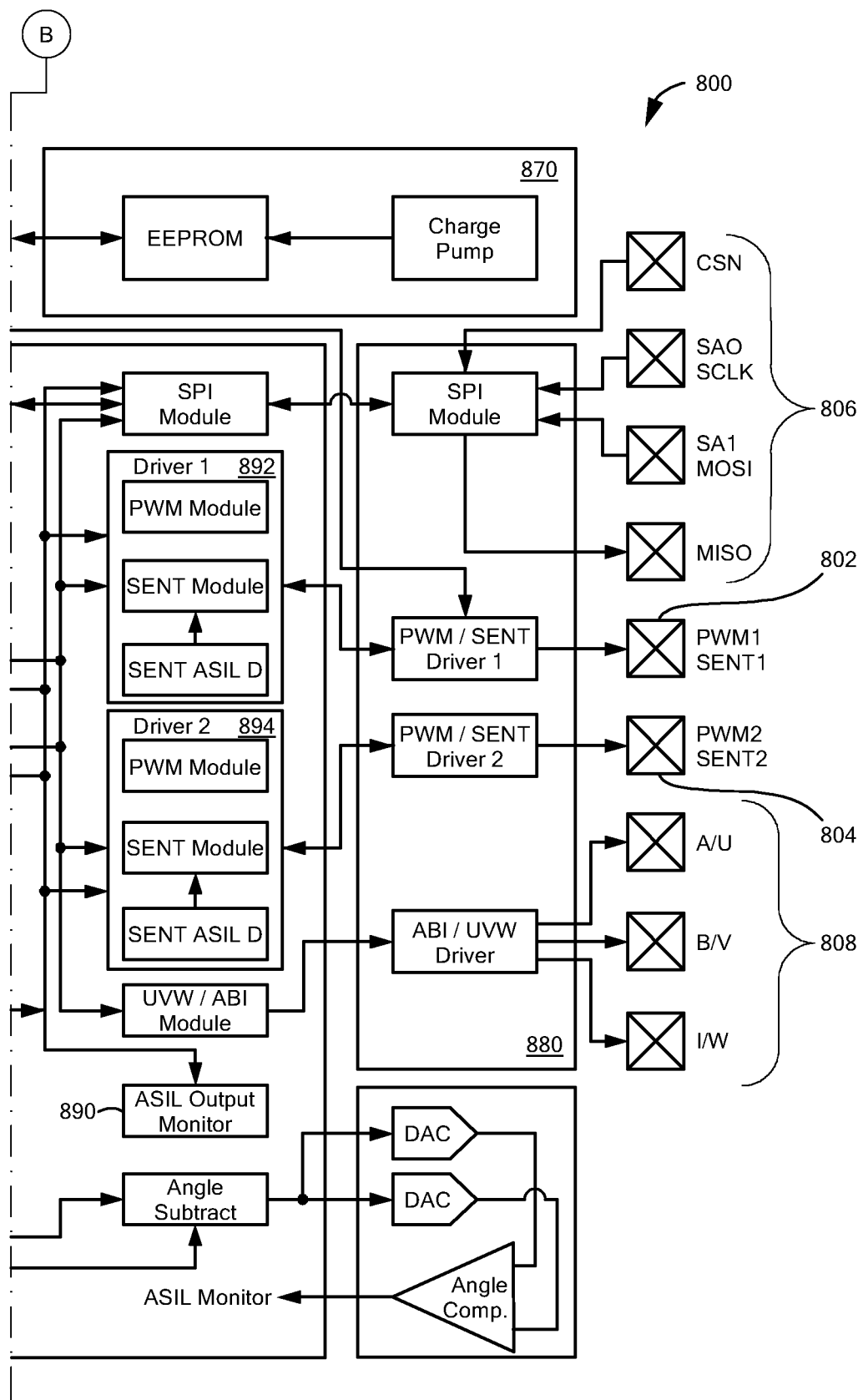
FIG. 8 (cont. cont.)

SENSOR INTEGRATED CIRCUITS HAVING A SINGLE EDGE NIBBLE TRANSMISSION (SENT) OUTPUT

FIELD

This disclosure relates generally to sensor integrated circuits (ICs), and more particularly, to such circuits having Single Edge Nibble Transmission (SENT) output signals and designed to meet strict safety requirements.

BACKGROUND

Sensor integrated circuits are widely used in automobile control systems and other safety critical applications. Four automotive safety integrity levels (ASIL A, B, C and D) are defined by the ISO 26262 functional safety for road vehicles standard. The more stringent the ASIL, the higher the integrity requirements. For example, ASIL-D rating may be achieved either using homogeneous redundancy (i.e., two sensor ICs using the same technology, such as Hall elements or magnetoresistive elements, in a single package) or heterogeneous redundancy, e.g., two sensor ICs using different sensing technologies, or one sensor IC including two sensing technologies, for example Hall elements or magnetoresistive elements.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

The concepts described herein are directed to providing output data that is consistent or compatible with the SAE J2716 Single Edge Nibble Transmission (SENT) protocol standard and that achieves high diagnostic coverage and high data integrity as specified by ISO 26262. Some embodiments provide SENT data frames that conform to data nibble configurations that include frame counting and additional bits of information redundancy as specified by ISO 26262 (Part 5 in both 2011 and 2018 editions) to achieve the required levels of data integrity as well as specific device diagnostic information within the data nibbles. Some embodiments additionally or alternatively provide a single monolithic integrated circuit (IC) formed on a single semiconductor die having redundant SENT outputs.

In accordance with an embodiment, a sensor includes a sensing element to produce a sensing element signal and a processor responsive to the sensing element signal to generate a sensor output signal comprising a Single Edge Nibble Transmission (SENT) frame. The SENT frame includes a Status and Communication (SCN) nibble comprising a bit 0 and a bit 1 that represent a status of at least one internal diagnostic indicator and a plurality of data nibbles. At least one of the plurality of data nibbles comprises a cyclic redundancy check (CRC), the CRC being an encoding of the bit 0 and the bit 1 of the SCN nibble and the plurality of data nibbles and at least one of the plurality of data nibbles comprises a count that indicates a new frame, the CRC being at least a five bit value.

In accordance with an embodiment, a sensor includes a single semiconductor die supporting a sensing element to produce a sensing element signal and a processor responsive to the sensing element signal to generate a first sensor output signal at a first sensor output and a second sensor output signal at a second sensor output. The first sensor output signal comprises a first Single Edge Nibble Transmission (SENT) frame and the second sensor output signal comprises a second SENT frame, wherein the first SENT frame and the second SENT frame include the same data.

In accordance with an embodiment, a method for generating a Single Edge Nibble Transmission (SENT) output signal of a sensor includes generating a sensing element signal indicative of a characteristic of a target with a sensing element and processing the sensing element signal to generate the SENT output signal indicative of the characteristic. The processing comprises indicating a status of at least one diagnostic indicator in a Status and Communication (SCN) nibble of the SENT output signal, wherein the SCN nibble comprises a bit 0 and a bit 1, and embedding in at least one of a plurality of data nibbles of the SENT output signal (a) a cyclic redundancy check (CRC) of the bit 0 and the bit 1 of the SCN nibble and the plurality of data nibbles and (b) a count indicative of a new frame, the CRC being at least a five bit value.

BRIEF DESCRIPTION OF THE DRAWINGS

The foregoing features of the disclosure, as well as the disclosure itself may be more fully understood from the following detailed description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the claimed subject matter. Like numbers in the figures denote like elements.

DETAILED DESCRIPTION

Figure 1:
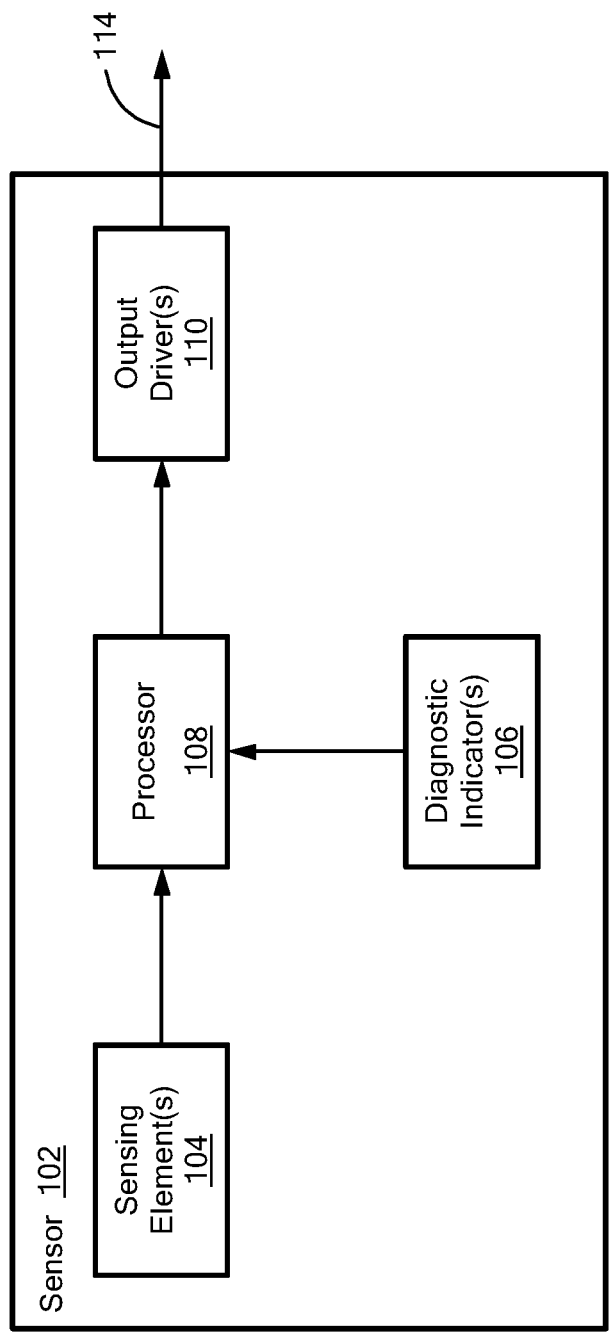
FIG. 1 is a block diagram illustrating selected components of an example sensor for providing an ISO 26262 high coverage serial frame compliant Single Edge Nibble Transmission (SENT) output, in accordance with an embodiment of the present disclosure.
Figure 1:
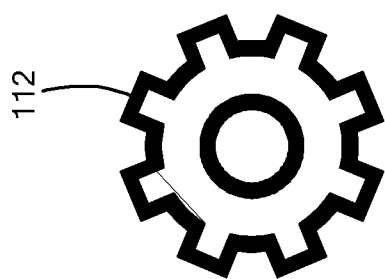

Before describing the various embodiments of the concepts described herein, some introductory concepts and terminology are explained. As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field signal" is used to describe any signal that results from a magnetic field experienced by a magnetic field sensing element.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, a current sensor, or a proximity detector.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector (or movement detector) that senses passing ferromagnetic articles, for example, magnetic domains of a ring magnet or a ferromagnetic target (e.g., gear teeth) where the magnetic field sensor is used in combination with a back-bias or other magnet, and a magnetic field sensor that senses a magnetic field density of a magnetic field.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

It should be understood that a so-called "comparator" can be comprised of an analog comparator having a two-state output signal indicative of an input signal being above or below a threshold level (or indicative of one input signal being above or below another input signal). However the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

Signals with pulses are described herein as generated by a magnetic field sensor. In some embodiments, the signals are provided on a communication link to an external processor, for example, a CPU within an automobile, to further process the pulses. As used herein, the term "pulse" is used to describe a signal that begins at a first level or state, transitions rapidly to a second level or state different than the first level and returns rapidly to the first level.

Ferromagnetic objects described herein can have a variety of forms, including, but not limited to, a ring magnet having one or more pole pair, and a gear having two or more gear teeth. Ferromagnetic gears are used in some examples below to show a rotating ferromagnetic object having ferromagnetic features, i.e., teeth. However, in other embodiments, the gear can be replaced with a ring magnet having at least one pole pair. Also, linear arrangements of ferromagnetic objects are possible that move linearly.

FIG. 1 is a block diagram illustrating selected components of an example sensor 102 for providing an ISO 26262 high coverage serial frame compliant Single Edge Nibble Transmission (SENT) output, in accordance with an embodiment of the present disclosure. Sensor 102 is configured to generate a sensor output signal 114 indicative of a parameter associated with a target 112. In embodiments, signal 114 can be in the SENT format that conforms to ISO 26262 high coverage serial frame, as will be further described below.

Sensor 102 can be any type of sensor intended for a variety of applications. For example, sensor 102 can be a magnetic field sensor intended for applications including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector (or movement detector) that senses passing ferromagnetic articles, for example, magnetic domains of a ring magnet or a ferromagnetic target (e.g., gear teeth) where the magnetic field sensor may be used in combination with a back-bias or other magnet, and a magnetic field sensor that senses a magnetic field density of a magnetic field. Thus, as non-limiting examples, target 112 can be a gear having gear teeth or a ring magnet having one or more pole pairs. In the example embodiment of FIG. 1, sensor 102 may take the form of a rotation detector to detect passing gear teeth, for example, the gear teeth of a ferromagnetic gear or, more generally, target 112.

Still referring to FIG. 1, sensor 102 may include sensing element(s) 104, a processor 106, diagnostic indicator(s) 108, and an output driver 110. Sensing element(s) 104 provide signals representative of the detected target parameter. For example, in the case of a magnetic field sensor 102, sensing element(s) 104 can generate one or more signals representative of a sensed magnetic field. Sensing element(s) 104 can take a variety of forms, such as Hall effect elements as may be affected by movement of target 112. Other types of magnetic field sensing elements such as magnetoresistive elements (for example, a giant magnetoresistance (GMR) element, an anisotropic magnetoresistance element (AMR), a tunneling magnetoresistance (TMR) element, an Indium antimonide (InSb) sensor, a Gallium Arsenide (GaAs) sensor, and magnetic tunnel junction (MTJ) devices) are also suitable. Furthermore, sensing element(s) 104 may sense other types of target parameters such as temperature, pressure, etc. Sensing element(s) 104 may be a single ended or differential arrangement and may include one or more individual sensing elements in various known configurations. The output of sensing element(s) 104 is coupled to processor 108.

Diagnostic indicator(s) 106 provide diagnostic and/or fault processing. For example, diagnostic indicator(s) 106 can be configured to detect a failure or fault of sensor 102. In an example implementation, diagnostic indicator(s) 106 can be configured to test one or more components, such as, for example, magnetic field sensing elements, differential preamplifiers, channel amplifier, detector circuits, of sensor 102. Other example diagnostic indicators 106 can detect whether signals (e.g., signals processed in two different processing channels) vary from each other and/or from a predetermined threshold by more than a predetermined amount, overtemperature, overcurrent, overvoltage. Upon detecting a failure or a fault, diagnostic indicator(s) 106 can provide a fault indication or fault state to processor 108. In such embodiments, the fault indication may be provided as a current signal to processor 108 or any other appropriate component of sensor 102 at a signal level other than the levels used to convey normal operating information (e.g., a diagnostic or fault current).

Processor 108 processes the signals provided by sensing element(s) 104. For example, processor 108 can process the magnetic field signals provided by sensing element(s) 104 to determine the speed, position, and/or direction of movement, such as rotation of target 112. In embodiments, processor 108 can determine the speed, position, and/or direction of target 112 based on the magnetic field signal provided by sensing element(s) 104 and can combine this information with fault information provided by diagnostic indicator(s) 106. In any case, the output of processor 108 is coupled to output driver(s) 110.

Output driver(s) 110 receive the signal provided by processor 108 and provides sensor output signal(s) 114 in a form consistent with the sensor output configuration. For example, in embodiments in which the sensor output is a so-called two-wire output, driver 110 provides the sensor output signal in the form of current pulses on the power connection to the sensor or a in a so-called three-wire output, driver 110 provides the sensor output signal at a separate dedicated output connection.

The format of the output signal 114 is the SENT format and sensor 102 conforms to ISO 26262 high coverage serial frame. In some implementations, sensor 102 can include a single output at which a single SENT output signal 114 is provided with additional data integrity measures to allow for achieving ISO 26262 high coverage serial frame compliance in systems (see e.g., FIG. 5). In some implementations, sensor 102 can include multiple redundant outputs of a single monolithic IC formed on a single semiconductor die at which respective SENT output signals 114 are provided. For example, redundant sensor outputs can be used to transmit SENT signals containing the same, redundant data. It will be appreciated that in some implementations, additional sensor outputs can provide output signals in other formats, such as PWM, UVW/ABI, and/or SPI.

Figure 2:
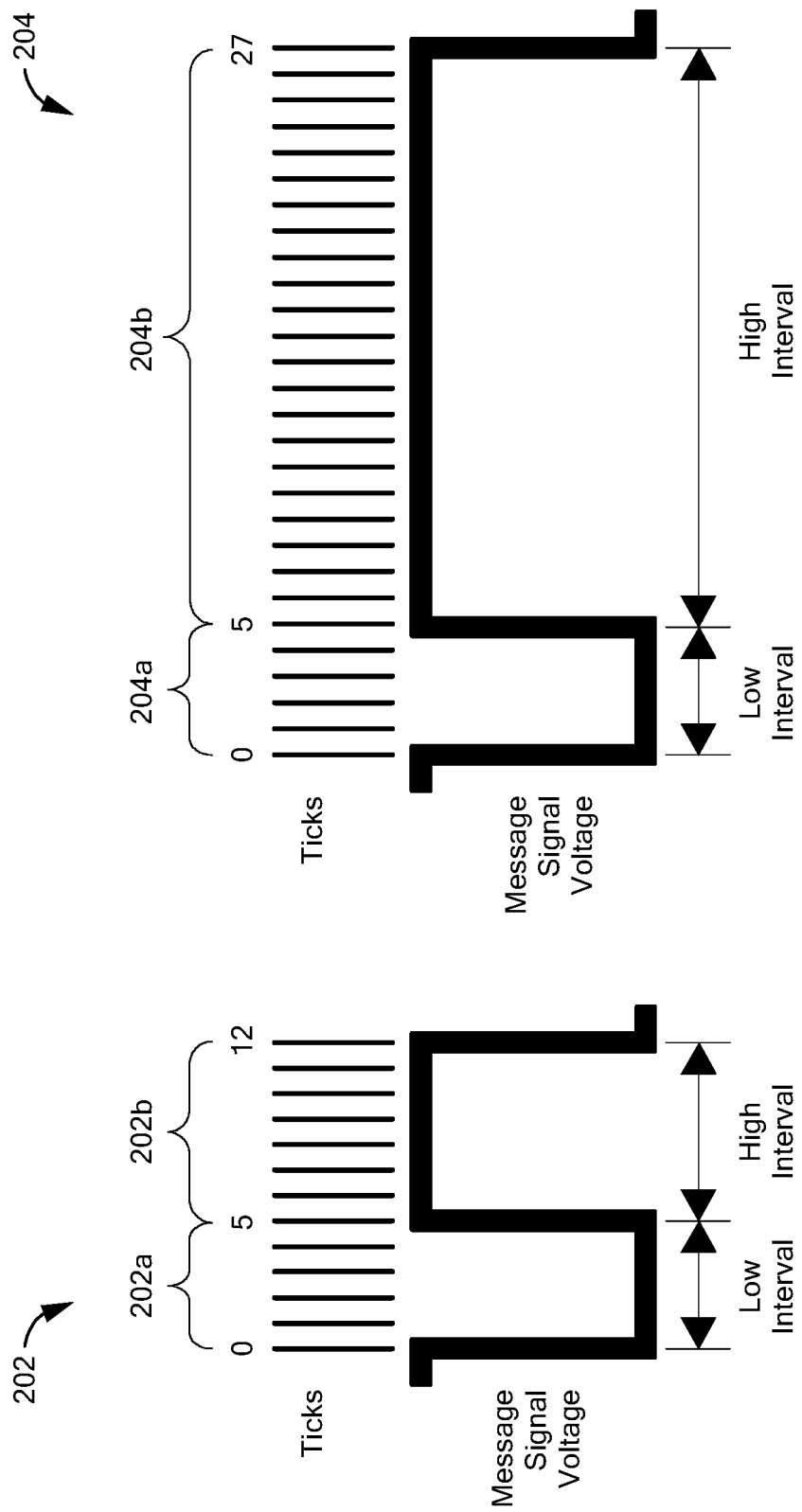
FIG. 2 shows example timing diagrams for Single Edge Nibble Transmission (SENT) data encoding for the Data, Status and Communication and CRC nibbles.

FIG. 2 shows example timing diagrams for Single Edge Nibble Transmission (SENT) data encoding for the Data, Status and Communication and CRC nibbles. A "tick" refers to the nominal clock signal period and a "nibble" is 4 bits. Each nibble is an ordered pair of a low-voltage (low state) interval followed by a high-voltage (high state) interval. The low-voltage interval has a default duration of 5 ticks. The high-voltage interval contains information and is variable in duration as dictated by the information value of the nibble (i.e., the data payload of the nibble). The duration of a nibble is denominated in clock ticks. The period of a tick is configurable.

For example, as shown in FIG. 2, a nibble 202 encodes the data value '0000' and a nibble 204 encodes the data value '1111'. More specifically, nibble 202 includes a low-voltage interval 202a of duration five ticks and a high-voltage interval 202b of duration seven ticks which encode the data value '0000'. Nibble 204 includes a low-voltage interval 204a duration of five ticks and a high-voltage interval 204b duration of 22 ticks which encode the data value '1111'. More generally, the length of a nibble can be calculated as (12+N), where N is the nibble data values which can be varied between '0000' (0) and '1111' (15).

Figure 3:
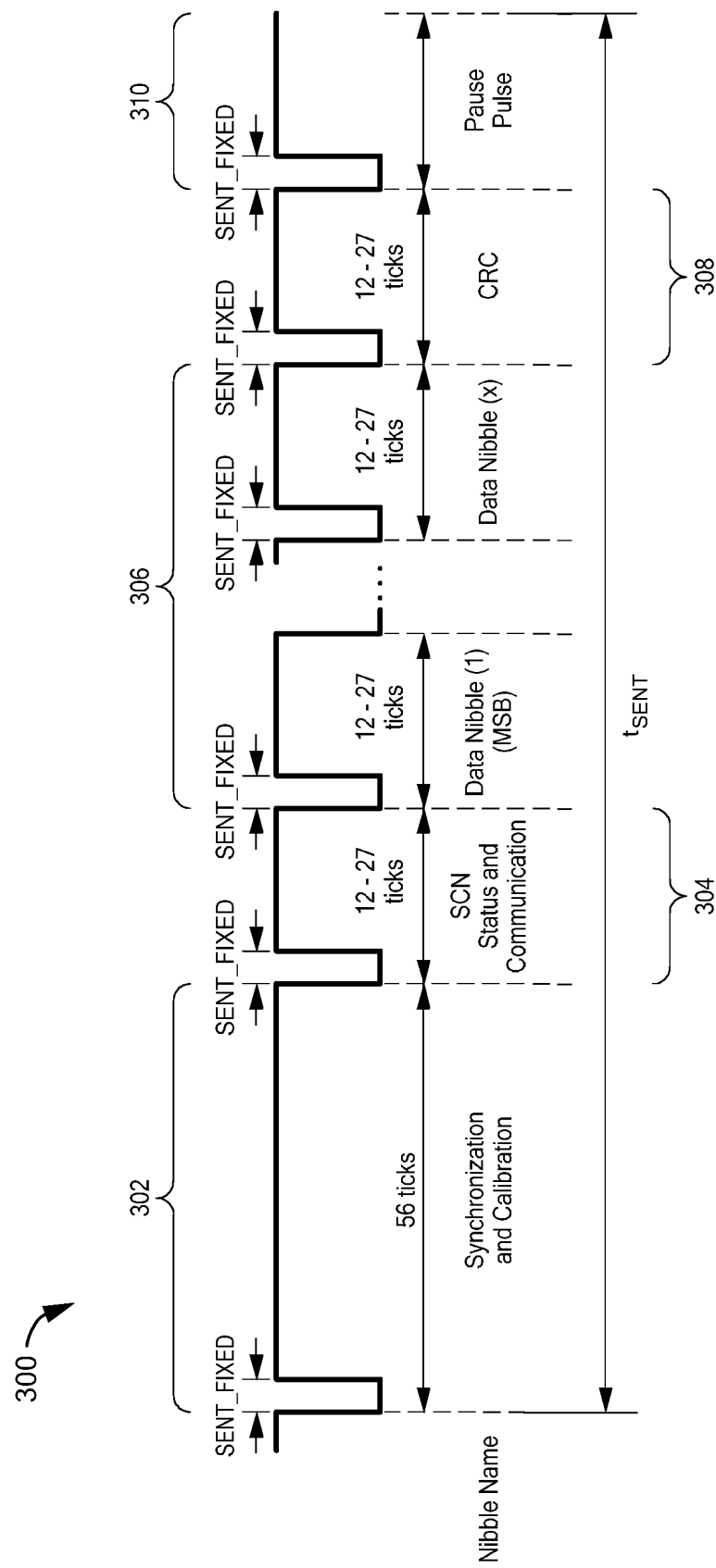
FIG. 3 shows an example timing diagram for a Single Edge Nibble Transmission (SENT) message frame.

FIG. 3 shows an example timing diagram for a Single Edge Nibble Transmission (SENT) message frame. For example, sensor output signal 114 output by sensor 102 may have a standard unidirectional signal format, such as the illustrated SENT signal format as shown in FIG. 3. A SENT message is a series of nibbles where each nibble is an ordered pair of a low-voltage interval followed by a high-voltage interval. The duration of a nibble is the sum of the low-voltage interval and the high-voltage interval.

As shown in FIG. 3, a SENT frame 300 comprises a sequence of pulses which may be repeatedly sent by a transmitting module (e.g., sensor 102). SENT frame 300 includes at least four portions: a Synchronization and Calibration portion 302, a Status and Communication (SCN) portion 304, a Data portion 306, and a Checksum (or cyclic redundancy check, CRC) portion 308. Synchronization and Calibration portion 302 flags the start of the SENT message and has a pulse duration of 56 ticks measured from falling edge to falling edge. Synchronization and Calibration portion 302 can be used to rescale the subsequent nibble values to correct for clock variation between a controller (e.g., a host microcontroller) and sensor 102.

SCN portion 304 is used to inform of the sensor status or features (such as part numbers or error code information) and format and contents of Data portion 306. SCN portion 304 has a pulse duration of between 12 and 27 ticks to provide four bits with values ranging from 0 to 15. SCN portion 304 can be used to provide diagnostic information as well as other status and supplemental data.

Data portion 306 includes up to six nibbles of data, with each data nibble containing four bits with values ranging from 0 to 15. Thus, each data nibble has a pulse duration of between 12 and 27 ticks. The number of data nibbles may be fixed for each application but can vary between applications. For example, six data nibbles can be communicated to transmit two 12 bit values.

CRC portion 308 is a value that is calculated on the message frame.

Conventionally, CRC portion 308 has a pulse duration of between 12 and 27 ticks to provide four bits. CRC portion 308 can be used to check the validity of the message frame.

SENT frame 300 may include an optional Pause Pulse portion 310 that may be used to set timing between message frames. In other words, Pause Pulse portion 310 can be used to compensate for the varying length of the messages. Pause Pulse portions 310 has a minimum pulse duration of 12 ticks and can be extended to correlate with the internal update rate at the start of Synchronization and Calibration portion 302.

Figure 4:
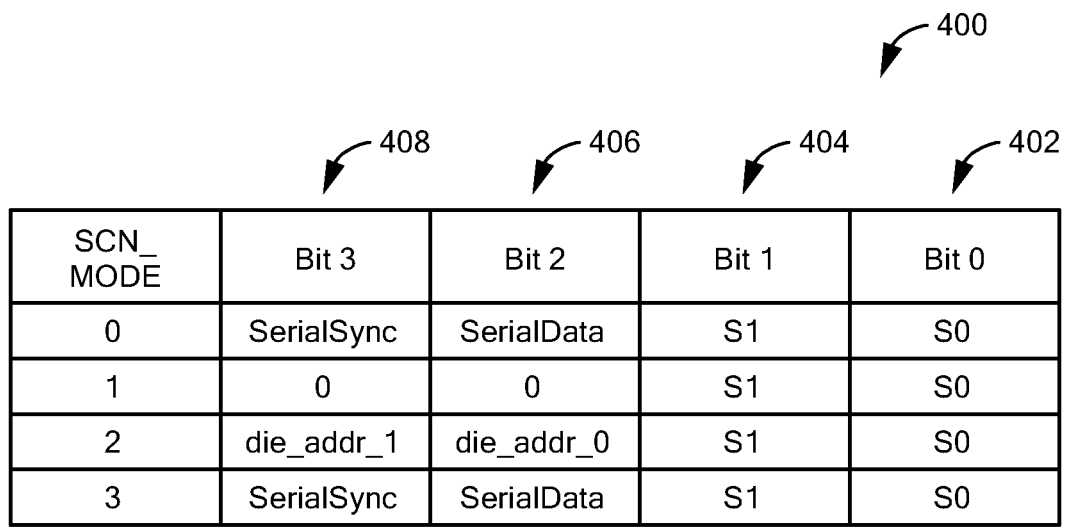
FIG. 4 is a table showing Status and Communication (SCN) configuration options.

FIG. 4 is a table 400 showing Status and Communication (SCN) nibble configuration options (i.e., SCN modes). For example, the SCN nibble is included in SCN portion 304 of each SENT frame. The SCN nibble communicates status and/or slow channel data bits depending on the SENT format. As shown, the SCN nibble includes a bit 0 402, a bit 1 404, a bit 2 406, and a bit 3 408. Bit 0 402 and bit 1 404 communicate error flag S0 and error flag S1, respectively, which are used to report the status of the internal diagnostic indicators of the device. For example, by monitoring the bit 0 402 and bit 1 404 of the SCN nibble, it is possible for an external controller to detect an error condition reported by the internal diagnostics. An optional Enhanced serial message includes greater details of the error conditions by reporting the status of many monitors.

Bit 2 406 and bit 3 408 of the SCN nibble can be used to transmit a Short Serial Message format message or an Enhanced Serial Message format message as specified by the SENT protocol. Both the Short Serial Message format and the Enhanced Serial Message format encodes a longer serial message using bit 2 406 and bit 3 408 of the SCN nibble. Bit 2 406 and bit 3 408 of the SCN nibble can be used to transmit additional data that is accumulated over multiple frames. In other words, a single message can be encoded using multiple SENT data frames.

Figure 5:
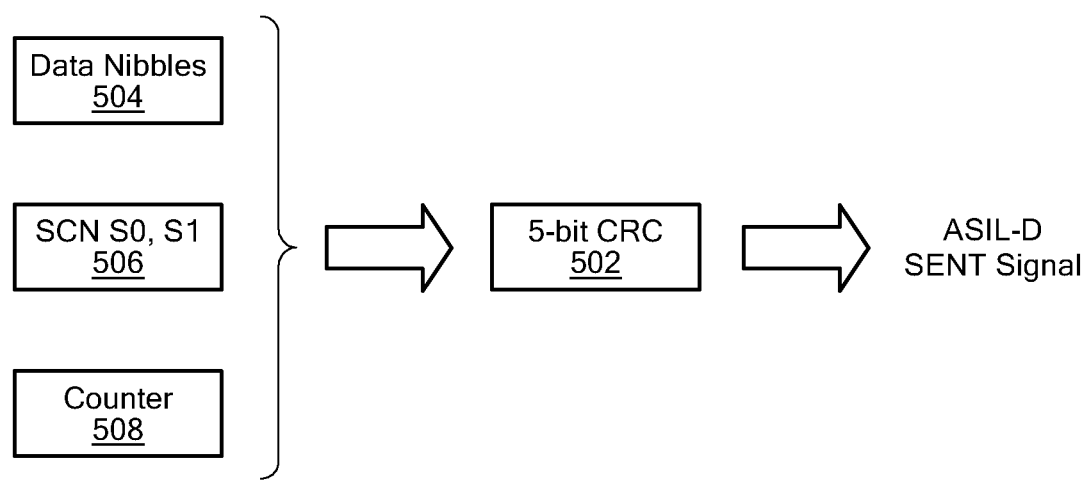
FIG. 5 is a diagram showing composition of an ISO 26262 high coverage serial frame compliant Single Edge Nibble Transmission (SENT) signal, in accordance with an embodiment of the present disclosure.

FIG. 5 is a diagram showing composition of an ISO 26262 high coverage serial frame compliant Single Edge Nibble Transmission (SENT) signal as may be generated by sensor 102 as sensor output signal 114, in accordance with an embodiment of the present disclosure. The ISO 26262 high coverage serial frame SENT signal includes additional data integrity measures to allow for achieving the ISO 26262 high coverage serial frame compliance in systems, such as systems including sensor 102 described previously, when using a singled SENT output without the need for full (i.e., output signal) redundancy.

In an embodiment, and as shown in FIG. 5, the high level data integrity specified by ISO 26262 high coverage serial frame is in part provided using a CRC 502 that is a five bit CRC derived from data nibbles 504, SCN S0, S1 506, and a counter 508. CRC 502 is included as part of the data nibbles of a SENT frame. The five bit CRC 502 provides reasonable assurance of the integrity of a SENT frame and, particularly, data nibbles 504, SCN S0, S1 506, and counter 508 of the SENT frame. Data nibbles 504 are the data, such as sensor 102 data, that is to be communicated using the SENT frame. SCN S0, S1 506 are the S0 and S1 error flags (i.e., the values for bit 0 and bit 1 of the SCN nibble) that are to be communicated using the SENT frame. Counter 508 is a SENT frame count and is included in the SENT frame to indicate a new SENT frame. Thus, CRC 502 improves the data integrity of the SENT frame. The combination of a counter that is included in a SENT frame and a five bit CRC value derived from the values of the data nibbles, bit 0 and bit 1 of the SCN nibble, and the counter provide the requisite level of data integrity specified by ISO 26262 high coverage serial frame to allow the SENT frame to be ISO 26262 high coverage serial frame compliant.

Figures 6, 7:
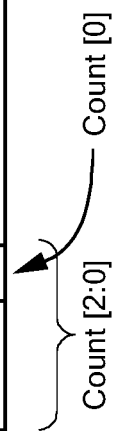
FIG. 6 is a diagram showing an example data nibble configuration for an ISO 26262 high coverage serial frame compliant Single Edge Nibble Transmission (SENT) frame, in accordance with an embodiment of the present disclosure.
FIG. 7 is a diagram showing an example data nibble configuration for an ISO 26262 high coverage serial frame compliant Single Edge Nibble Transmission (SENT) multi-frame, in accordance with an embodiment of the present disclosure.

FIG. 6 is a diagram showing an example data nibble configuration for an ISO 26262 high coverage serial frame compliant Single Edge Nibble Transmission (SENT) frame, in accordance with an embodiment of the present disclosure. The data nibble configuration of FIG. 6 allows for transmitting data over an ASIL-D SENT frame. In an implementation, such an ISO 26262 high coverage serial frame compliant SENT data nibble configuration can be indicated by a parameter of an EEPROM of a sensor (e.g., sensor 102), such as an EEPROM parameter sent_data_cfg. As shown, the data nibble configuration of the ISO 26262 high coverage serial SENT frame includes 6 nibbles of data, Data Nibble #1 to Data Nibble #6, where Data Nibble #1 is the most significant data nibble and Data Nibble #6 is the least significant data nibble.

Data Nibble #6 and the least significant bit 0 of Data Nibble #5 are used to specify the 5-bit CRC (CRC [4:0]). The remaining three bits of Data Nibble #5 (bit 3 to bit 1) are used to specify the frame counter (Count [2:0]). The frame counter is incremented to indicate or otherwise inform that a SENT frame is new (i.e., is not a repeat of the preceding SENT frame). In operation, the frame counter is incremented once for every frame that is sent up to a maximum count. At the next count after the maximum, the frame counter is reset and starts the count again at 0. The maximum count value is determined by the size of the frame counter. For example, in the example data nibble configuration of FIG. 6, the frame counter is a three bit counter with a maximum count value of seven ('111'). As such, the frame counter starts from 0 and is incremented once for every frame that is sent up to a maximum count of seven ('000', '001', '010', '011', '100', '101', '110', '111') before starting again at 0 ('000'). Data Nibble #1 to Data Nibble #4 (Data [15:12], Data [11:8], Data [7:4], and Data [3:0]) are used to specify the output from a sensor, such as sensor 102. A SENT frame having data nibble configuration of FIG. 6 is able to transmit four data nibbles (a 16 bit value).

FIG. 7 is a diagram showing an example data nibble configuration for an ISO 26262 high coverage serial frame compliant Single Edge Nibble Transmission (SENT) multi-frame, in accordance with an embodiment of the present disclosure. The data nibble configuration of FIG. 7 allows for transmitting data over two consecutive ASIL-D SENT frames. In an implementation, such an ISO 26262 high coverage serial frame compliant SENT data nibble configuration can be indicated by a parameter of an EEPROM of a sensor (e.g., sensor 102), such as an EEPROM parameter sent_data_cfg. As shown, the data nibble configuration of the ISO 26262 high coverage serial SENT frame includes 6 nibbles of data, Data Nibble #1 to Data Nibble #6, where Data Nibble #1 is the most significant data nibble and Data Nibble #6 is the least significant data nibble.

Data Nibble #6 and the least significant bit 0 of Data Nibble #5 are used to specify the five bit CRC (CRC [4:0]). The remaining three bits of Data Nibble #5 (bit 3 to bit 1) are used to specify the frame counter (Count [2:0]). The frame counter is incremented to indicate or otherwise inform that a SENT frame is new (i.e., is not a repeat of the preceding SENT frame). In operation, the frame counter is incremented once for every frame that is sent up to a maximum count. At the next count after the maximum, the frame counter is reset and starts the count again at 0. The maximum count value is determined by the size of the frame counter. Data Nibble #1 to Data Nibble #4 (Data [15:12], Data [11:8], Data [7:4], and Data [3:0]) are used to specify the output from a sensor, such as sensor 102.

The least significant bit of the frame counter (bit 1 of Data Nibble #5) indicates a particular frame of the multi-frame sequence. For example, in an implementation, a value of '0' for the least significant bit of the frame counter (Count [0]=0) indicates an Even ISO 26262 high coverage serial SENT frame of the multi-frame sequence, and a value of '1' for the least significant bit of the frame counter (Count [0]=1) indicates an Odd ISO 26262 high coverage serial SENT frame of the multi-frame sequence. Note that the value of the least significant bit of the frame counter alternates between the values '0' and '1' since the frame counter is incremented once for every frame that is sent. The Even frame indicated by Count [0]=0 indicates a first set of four data nibbles and the Odd frame indicated by Count [0]=1 indicates a second set of four data nibbles. Thus, using the data nibble configuration of FIG. 7, eight data nibbles can be transmitted over two consecutive ISO 26262 high coverage serial SENT frames.

Figure 8:
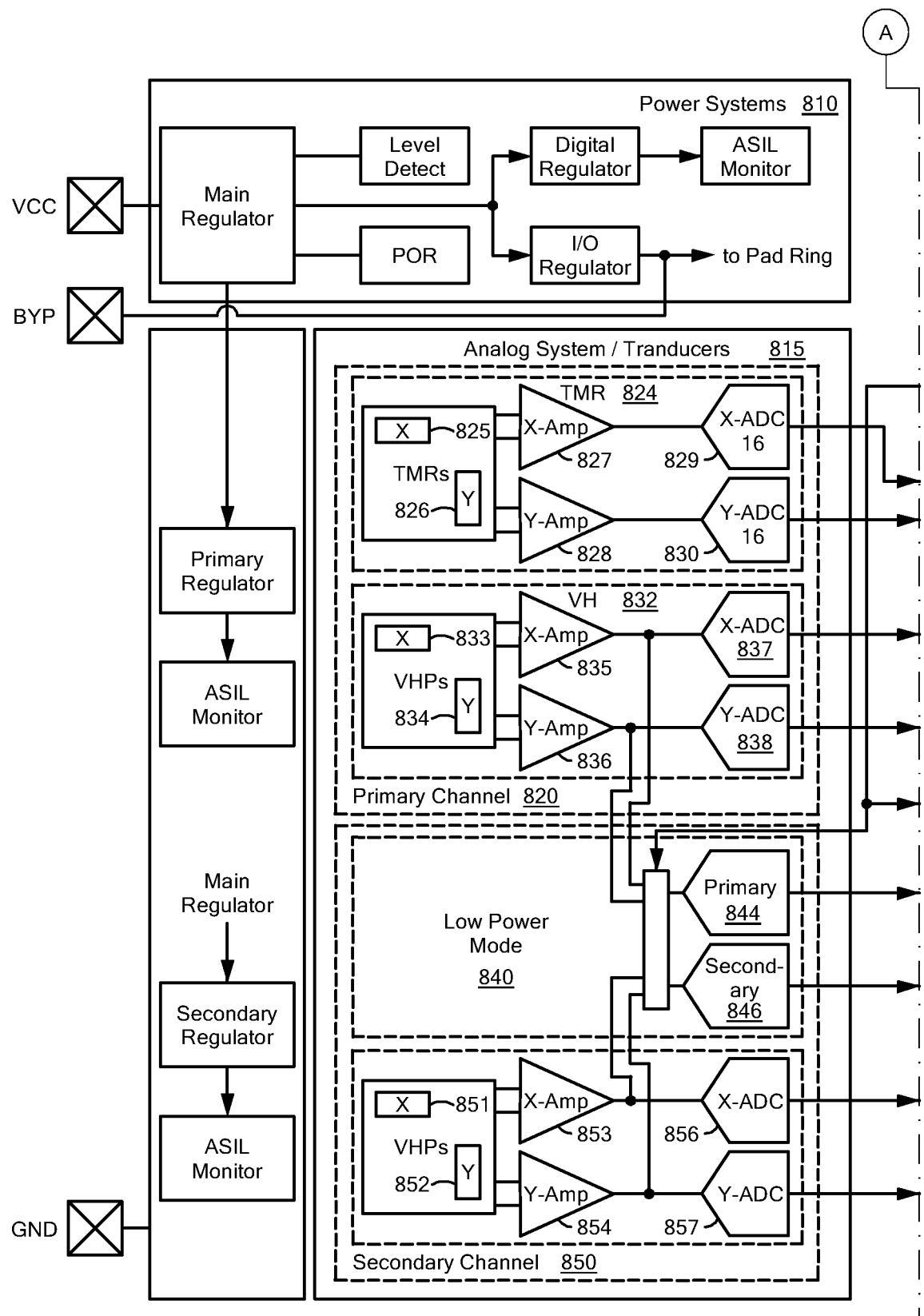
FIG. 8 is a block diagram illustrating an example magnetic field sensor for providing an ISO 26262 high coverage serial frame compliant Single Edge Nibble Transmission (SENT) output and including redundant SENT outputs, in accordance with an embodiment of the present disclosure.
Figure 8:
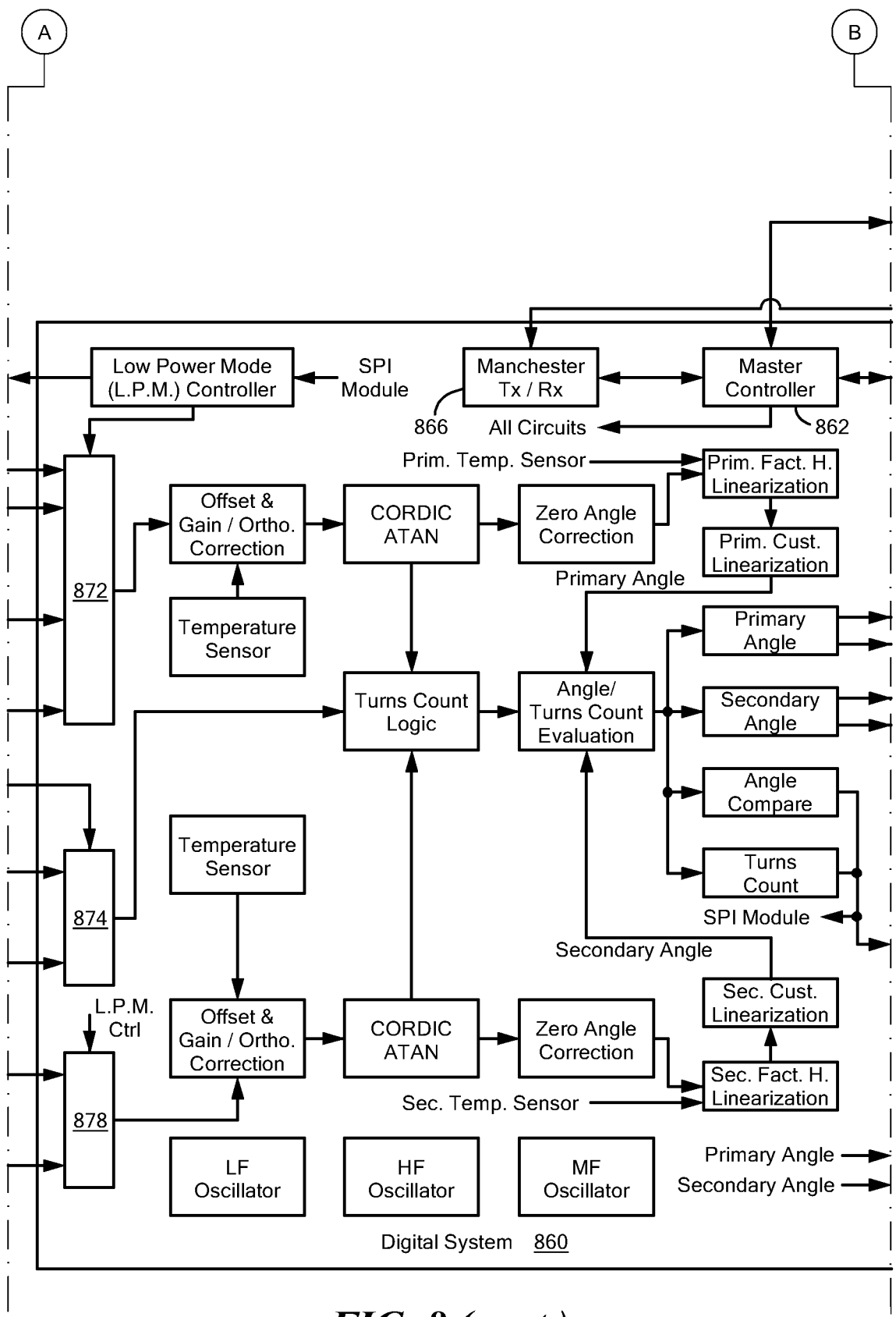

FIG. 8 is a block diagram illustrating an example magnetic field sensor 800 for providing an ISO 26262 high coverage serial frame compliant Single Edge Nibble Transmission (SENT) output and including redundant SENT outputs 802, 804, in accordance with an embodiment of the present disclosure. For example, sensor 800 may be used to detect the angular position of a target, such as a camshaft or steering wheel (e.g., target 112 of FIG. 1). The redundant SENT outputs 802, 804 allow sensor 800 to provide a level of redundancy on the output data to achieve ISO 26262 high coverage serial frame compliance. It will be appreciated that one or both of the SENT outputs 802, 804 can be used to transmit SENT frames of the type described in connection with FIG. 5 (in which additional data integrity measures such as the described five bit CRC are provided) or conventional SENT frames in which case the frames transmitted at both SENT outputs 802, 804 contain the same data in order to thereby achieve ISO 26262 high coverage serial frame compliance.

As shown, sensor 800 includes a power system 810, an analog system 815, a digital system 860, and system memory 870 as may include an EEPROM. Analog system 815 includes a first (primary) channel 820, a low power mode circuit 840, and a second (secondary) channel 850. Primary channel 820 includes a full power portion 824 that is used in a full power mode of operation (e.g., when the engine is on), and a low power portion 832 that is used in a low power mode of operation (e.g., when the engine is off). Secondary channel 850 can be used during the low power mode and the full power mode. The dual channel sensor 800 provides redundant angle sensing in a single monolithic device formed on a single semiconductor die, as may take the form of a surface mount package for example.

Full power portion 824 includes first and second magnetic field sensing elements 825, 826, which may be TMR elements or other appropriate magnetic field sensing elements. Magnetic field sensing elements 825, 826 may be orthogonal with respect to each other. Each magnetic field sensing element 825, 826 is coupled to a respective amplifier 827, 828. The output of each amplifier 827, 828 is coupled to a respective analog-to-digital converter (ADC) 829, 830. Low power portion 832 includes third and fourth magnetic field sensing elements 833, 834, which may be Vertical Hall plate magnetic field sensing elements. Magnetic field sensing elements 833, 834 may be orthogonal with respect to each other. Each magnetic field sensing element 833, 834 is coupled to a respective amplifier 835, 836. The output of each amplifier 835, 836 is coupled to a respective ADC 837, 838.

Secondary channel 850 includes fifth and sixth magnetic field sensing elements 851, 852, which may be Vertical Hall plate magnetic field sensing elements, or other appropriate magnetic field sensing elements. Magnetic field sensing elements 851, 852 may be orthogonal with respect to each other. Each magnetic field sensing element 851, 852 is coupled to a respective amplifier 853, 854. The output of each amplifier 853, 854 is coupled to a respective ADC 856, 857.

Note that magnetic field sensing element 833 can be positioned at a predetermined non-zero angle with respect to element 851. This configuration allows information from both magnetic field sensing elements 833, 834 and elements 851, 852 to be acquired and processed during the low power mode of operation. For example, using the primary channel and the secondary channel together, low power mode circuit 840 may be able to more accurately determine the target angle in less time as described in co-pending U.S. application Ser. No. 16/398,522, entitled "Magnetic Field Angle Sensor Having a Low Power Mode and Associated Methods", filed on Apr. 30, 2019, which application is assigned to the Assignee of the subject application and hereby incorporated by reference in its entirety.

Low power mode circuit 840 includes a converter circuit having a primary portion 844 for receiving data from low power portion 832 of primary channel 820, and a secondary portion 846 for receiving data from secondary channel 850. Low power mode circuit 840 is configured to receive the magnetic field signals from each of magnetic field sensing elements 833, 834, 851, 852 and to determine the angular position of the target during the low power mode of operation. Sensor 800 includes angle turns counting components for use in the low power mode of operation. When operating in low power mode, a dedicated signal path monitors angle information, using Vertical Hall elements for the primary and secondary channels to track the turns count.

Referring still to FIG. 8, digital system 860 operates under the control of a master controller 862 (which may be referred to herein as a "processor") and includes a primary channel processing circuit 872 for receiving output signals of primary channel 820, a low power processing block 874 for receiving output signals of low power mode circuit 840, and secondary channel processing circuit 878 for receiving output signals of secondary channel 850. Which parts of the analog system 815 are active depends on the operational mode of sensor 800. For example, during the full power mode of sensor 800, magnetic field sensing elements 825, 826 can determine the position of an object and the output of full power portion 824 of primary channel 820 can be provided to primary channel processing circuit 872 and magnetic field sensing elements 851, 852 can determine the position of the object and the output of secondary channel 850 can be provided to secondary channel processing circuit 878. During the low power mode of sensor 800, magnetic field sensing elements 833, 834, 851, and 852 provide magnetic field signals that can be used to determine the position of the object. The output of low power portion 832 of primary channel 820 and secondary channel 850 are provided to low power mode circuit 840 and to low power processing block 874.

By providing both TMR elements 825, 826 and Vertical Hall elements 833, 834 for primary channel 820, when sensor 800 returns to full power mode from the low power mode, the position detected by the Vertical Hall magnetic field sensing elements 833, 834 can be compared to the position detected by the TMR magnetic field sensing elements 825, 826 to ensure that they are providing the same position, for example. If the position of full power portion 824 does not match the position of low power portion 832, an error signal can be generated by diagnostic indicators.

In operation, target angle can be calculated by CORDIC processors that operate in parallel to compute an angle measurement based on the input x-y vector. The resulting angle information, primary and secondary, is passed through additional processing and made available at sensor outputs. Various components can be provided for conditioning signals from primary channel processing circuit 872, low power processing block 874, and secondary channel processing circuit 878 prior to CORDIC processing. For example, offset and gain and/or orthogonality correction can be implemented. Additional conditioning after the CORDIC processing can include zero angle correction, filtering and linearization to reduce error from misalignment between the sensor and target.

Sensor 800 contains diagnostic indicators as may take the form of an ASIL output monitor 890. Monitor 890 can detect various error or fault or failure conditions. Examples include but are not limited detection of whether signals (e.g., signals processed in two different processing channels) vary from each other and/or from a predetermined threshold by more than a predetermined amount, overtemperature, overcurrent, and/or overvoltage conditions.

Additional elements of digital system 860 can include a Manchester encoder 866 for transmitting and receiving data to and from a PWM/SENT driver 1 in configurations using unidirectional PWM, ABI, or UVW protocols. Digital system 860 can also include a first temperature sensor for primary channel 820. The first temperature sensor can, for example, be responsive to a threshold temperature to identify an overtemperature condition of primary channel 820 of sensor 800. Digital system 860 can include a second temperature sensor for secondary channel 850. The second temperature sensor can be responsive to a threshold temperature to identify an overtemperature condition of secondary channel 850 of the sensor 800. Digital system 860 can include additional components, such as a low frequency (LF) oscillator, a high frequency (HF) oscillator, and a mid-frequency (MF) oscillator.

Sensor 800 can include outputs of various types controlled by drivers 880 and can be capable of different, user configurable, or programmable operational modes corresponding to different outputs being active. For example, in addition to the above-noted SENT outputs 802, 804, the sensor can include SPI outputs 806 controlled by a respective SPI driver and motor control outputs 808 including motor commutation outputs (U, V, W) or encoder outputs (A, B, I) controlled by a respective ABI/UVW driver. The redundant SENT outputs 802, 804 can alternatively be configured to provide PWM output signals in certain applications. Thus, each of the outputs 802, 804 is controlled by a respective PWM/SENT driver, as shown.

Digital PWM/SENT drivers 892, 894 are coupled to respective output drivers 880 for independent, redundant outputs 802, 804. Each driver 892, 894 contains a PWM module for use in configurations in which the respective outputs 802, 804 provide PWM formatted output signals, and SENT modules for use in configurations in which the respective outputs 802, 804 provide conventional sent signals (i.e., SENT signals that do not contain the above-described five bit CRC). When outputs 802, 804 are configured to provide conventional SENT signals, each such output is used to transmit signals having the same (i.e., redundant) data in order to thereby achieve ISO 26262 high coverage serial frame compliance with a single monolithic device 800 having a single semiconductor die. Each driver 892, 894 further contains ISO 26262 high coverage serial frame SENT drivers for use when device 800 is configured to provide SENT signals at one or both outputs 802, 804 of the form shown in FIG. 5 (i.e., with the five bit CRC as described above).

Figure 9:
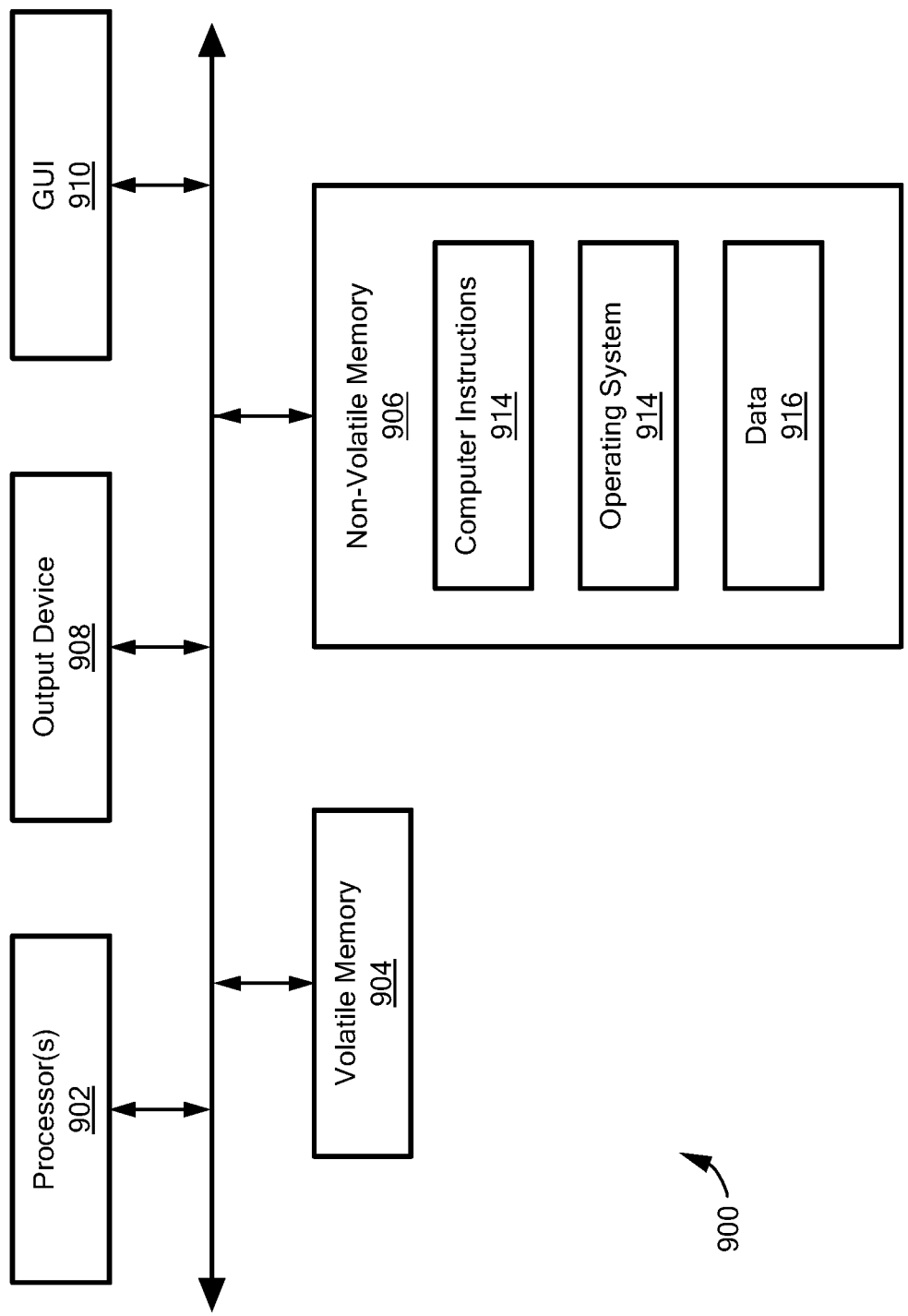
FIG. 9 is a block diagram illustrating selective components of an example computing device in which various aspects of the disclosure may be implemented, in accordance with an embodiment of the present disclosure.

FIG. 9 is a block diagram illustrating selective components of an example computing device 900 in which various aspects of the disclosure may be implemented, in accordance with an embodiment of the present disclosure. Computing device 900 includes a processor 902, a volatile memory 904, a non-volatile memory 906 (e.g., hard disk), an output device 908, and a graphical user interface (GUI) 910 (e.g., a mouse, a keyboard, a display, for example). Non-volatile memory 906 stores computer instructions 912, an operating system 914, and data 916. In one example, computer instructions 912 are executed by processor 902 out of volatile memory 904. In one embodiment, a computer-readable storage article comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

The following examples pertain to further embodiments, from which numerous permutations and configurations will be apparent.

Example 1 includes a sensor including: a sensing element to produce a sensing element signal; and a processor responsive to the sensing element signal to generate a sensor output signal comprising a Single Edge Nibble Transmission (SENT) frame, wherein the SENT frame comprises a Status and Communication (SCN) nibble comprising a bit 0 and a bit 1 that represent a status of at least one internal diagnostic indicator; and a plurality of data nibbles, wherein at least one of the plurality of data nibbles comprises a cyclic redundancy check (CRC), the CRC being an encoding of the bit 0 and the bit 1 of the SCN nibble and the plurality of data nibbles and at least one of the plurality of data nibbles comprises a count that indicates a new frame, the CRC being at least a five bit value.

Example 2 includes the subject matter of Example 1, wherein the plurality of data nibbles includes between three nibbles and six nibbles, inclusive.

Example 3 includes the subject matter of any of Examples 1 and 2, wherein a repeated count value in successive fames indicates a repeated frame.

Example 4 includes the subject matter of any of Examples 1 through 3, wherein the count is a three bit value.

Example 5 includes the subject matter of any of Examples 1 through 4, wherein the sensing element comprises one or more magnetic field sensing elements.

Example 6 includes the subject matter of Example 5, wherein the one or more magnetic field sensing elements comprise one or more of a Hall effect element and a magnetoresistance element.

Example 7 includes the subject matter of any of Examples 1 through 6, wherein the sensor output signal is indicative of a characteristic of a target proximate to the sensor.

Example 8 includes the subject matter of Example 7, wherein the characteristic is one or more of a speed of motion of the target, a direction of motion of the target, and an angular position of the target.

Example 9 includes the subject matter of any of Examples 1 through 8, wherein the count indicates a frame of a multi-frame sequence.

Example 10 includes a sensor including: a single semiconductor die supporting: a sensing element to produce a sensing element signal; and a processor responsive to the sensing element signal to generate a first sensor output signal at a first sensor output and a second sensor output signal at a second sensor output, the first sensor output signal comprising a first Single Edge Nibble Transmission (SENT) frame and the second sensor output signal comprising a second SENT frame, wherein the first SENT frame and the second SENT frame include the same data.

Example 11 includes the subject matter of Example 10, wherein the sensing element comprises one or more magnetic field sensing elements.

Example 12 includes the subject matter of Example 11, wherein the one or more magnetic field sensing elements comprise one or more of a Hall effect element and a magnetoresistance element.

Example 13 includes the subject matter of any of Examples 10 through 12, wherein the sensor output signal is indicative of a characteristic of a target proximate to the sensor.

Example 14 includes the subject matter of Example 13, wherein the characteristic is one or more of a speed of motion of the target, a direction of motion of the target, and an angular position of the target.

Example 15 includes the subject matter of any of Examples 10 through 14, wherein the single semiconductor die further supports a first SENT driver to generate the first signal and a second SENT driver to generate the second signal.

Example 16 includes the subject matter of any of Examples 10 through 15, wherein the single semiconductor die further supports one or more of a UVW/ABI driver, an SPI driver, and a PWM driver.

Example 17 includes the subject matter of any of Examples 10 through 16, wherein each of the first SENT frame and the second SENT frame includes: a Status and Communication (SCN) nibble comprising a bit 0 and a bit 1 that represent a status of at least one internal diagnostic indicator; and a plurality of data nibbles, wherein at least one of the plurality of data nibbles comprises a cyclic redundancy check (CRC), the CRC being an encoding of the bit 0 and the bit 1 of the SCN nibble and the plurality of data nibbles and at least one of the plurality of data nibbles comprises a count that indicates a new frame, the CRC being at least a five bit value.

Example 18 includes a method for generating a Single Edge Nibble Transmission (SENT) output signal of a sensor, the method including: generating a sensing element signal indicative of a characteristic of a target with a sensing element; and processing the sensing element signal to generate the SENT output signal indicative of the characteristic, wherein processing includes: indicating a status of at least one diagnostic indicator in a Status and Communication (SCN) nibble of the SENT output signal, wherein the SCN nibble comprises a bit 0 and a bit 1; and embedding in at least one of a plurality of data nibbles of the SENT output signal (a) a cyclic redundancy check (CRC) of the bit 0 and the bit 1 of the SCN nibble and the plurality of data nibbles and (b) a count indicative of a new frame, the CRC being at least a five bit value.

Example 19 includes the subject matter of Example 18, wherein the sensor comprises a single semiconductor die and wherein the method further comprises generating a first SENT output signal of the sensor and a second SENT output signal of the sensor, wherein the first SENT output signal and the second SENT output signal include the same data.

Example 20 includes the subject matter of any of Examples 18 and 19, wherein the plurality of data nibbles includes between three nibbles and six nibbles, inclusive.

Example 21 includes the subject matter of any of Examples 18 through 20, wherein a repeated count value in successive fames indicates a repeated frame.

Example 22 includes the subject matter of any of Examples 18 through 21, wherein the count is a three bit value.

Example 23 includes the subject matter of any of Examples 18 through 22, wherein the sensing element comprises one or more magnetic field sensing elements.

Example 24 includes the subject matter of Example 23, wherein the one or more magnetic field sensing elements comprise one or more of a Hall effect element and a magnetoresistance element.

Example 25 includes the subject matter of any of Examples 18 through 24, wherein the sensor output signal is indicative of a characteristic of a target proximate to the sensor.

Example 26 includes the subject matter of Example 25, wherein the characteristic is one or more of a speed of motion of the target, a direction of motion of the target, and an angular position of the target.

Example 27 includes the subject matter of any of Examples 18 through 26, wherein the count indicates a frame of a multi-frame sequence.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A sensor comprising:
    a sensing element to produce a sensing element signal; and
    a processor responsive to the sensing element signal to generate a sensor output signal comprising a Single Edge Nibble Transmission (SENT) frame, wherein the SENT frame comprises:
        a Status and Communication (SCN) nibble comprising a bit 0 and a bit 1 that represent a status of at least one internal diagnostic indicator, wherein the status includes an error condition reported by the at least one internal diagnostic indicator; and
        a plurality of data nibbles, wherein at least one of the plurality of data nibbles comprises a cyclic redundancy check (CRC), the CRC being an encoding of the bit 0 and the bit 1 of the SCN nibble and the plurality of data nibbles and at least one of the plurality of data nibbles comprises a count that indicates a new frame, the CRC being at least a five bit value.

2. The sensor of claim 1, wherein the plurality of data nibbles includes between three nibbles and six nibbles, inclusive.

3. The sensor of claim 1, wherein a repeated count value in successive frames indicates a repeated frame.

4. The sensor of claim 1, wherein the count is a three bit value.

5. The sensor of claim 1, wherein the sensing element comprises one or more magnetic field sensing elements.

6. The sensor of claim 5, wherein the one or more magnetic field sensing elements comprise one or more of a Hall effect element and a magnetoresistance element.

7. The sensor of claim 1, wherein the sensor output signal is indicative of a characteristic of a target proximate to the sensor.

8. The sensor of claim 7, wherein the characteristic is one or more of a speed of motion of the target, a direction of motion of the target, and an angular position of the target.

9. The sensor of claim 1, wherein the count indicates a frame of a multi-frame sequence.

10. A sensor comprising:
    a single semiconductor die supporting:
        a sensing element to produce a sensing element signal; and
        a processor responsive to the sensing element signal to generate a first sensor output signal at a first sensor output and a second sensor output signal at a second sensor output, the first sensor output signal comprising a first Single Edge Nibble Transmission (SENT) frame and the second sensor output signal comprising a second SENT frame, wherein the first SENT frame and the second SENT frame each comprises a Status and Communication (SCN) nibble comprising a bit 0 and a bit 1 that represent a status of at least one internal diagnostic indicator, wherein the status includes an error condition reported by the at least one internal diagnostic indicator, and wherein the first SENT frame and the second SENT frame include the same data.

11. The sensor of claim 10, wherein the sensing element comprises one or more magnetic field sensing elements.

12. The sensor of claim 11, wherein the one or more magnetic field sensing elements comprise one or more of a Hall effect element and a magnetoresistance element.

13. The sensor of claim 10, wherein the sensor output signal is indicative of a characteristic of a target proximate to the sensor.

14. The sensor of claim 13, wherein the characteristic is one or more of a speed of motion of the target, a direction of motion of the target, and an angular position of the target.

15. The sensor of claim 10, wherein the single semiconductor die further supports a first SENT driver to generate the first signal and a second SENT driver to generate the second signal.

16. The sensor of claim 10, wherein the single semiconductor die further supports one or more of a UVW/ABI driver, an SPI driver, and a PWM driver.

17. The sensor of claim 10, wherein each of the first SENT frame and the second SENT frame comprises:
 a plurality of data nibbles, wherein at least one of the plurality of data nibbles comprises a cyclic redundancy check (CRC), the CRC being an encoding of the bit 0 and the bit 1 of the SCN nibble and the plurality of data nibbles and at least one of the plurality of data nibbles comprises a count that indicates a new frame, the CRC being at least a five bit value.

18. A method for generating a Single Edge Nibble Transmission (SENT) output signal of a sensor, the method comprising:
 generating a sensing element signal indicative of a characteristic of a target with a sensing element; and
 processing the sensing element signal to generate the SENT output signal indicative of the characteristic, wherein processing comprises:
  indicating a status of at least one diagnostic indicator in a Status and Communication (SCN) nibble of the SENT output signal, wherein the SCN nibble comprises a bit 0 and a bit 1, wherein the status includes an error condition reported by the at least one internal diagnostic indicator; and
  embedding in at least one of a plurality of data nibbles of the SENT output signal (a) a cyclic redundancy check (CRC) of the bit 0 and the bit 1 of the SCN nibble and the plurality of data nibbles and (b) a count indicative of a new frame, the CRC being at least a five bit value.

19. The method of claim 18, wherein the sensor comprises a single semiconductor die and wherein the method further comprises generating a first SENT output signal of the sensor and a second SENT output signal of the sensor, wherein the first SENT output signal and the second SENT output signal include the same data.

20. The method of claim 18, wherein the count indicates a frame of a multi-frame sequence.

* * * * *